UNITED STATES PATENT OFFICE.

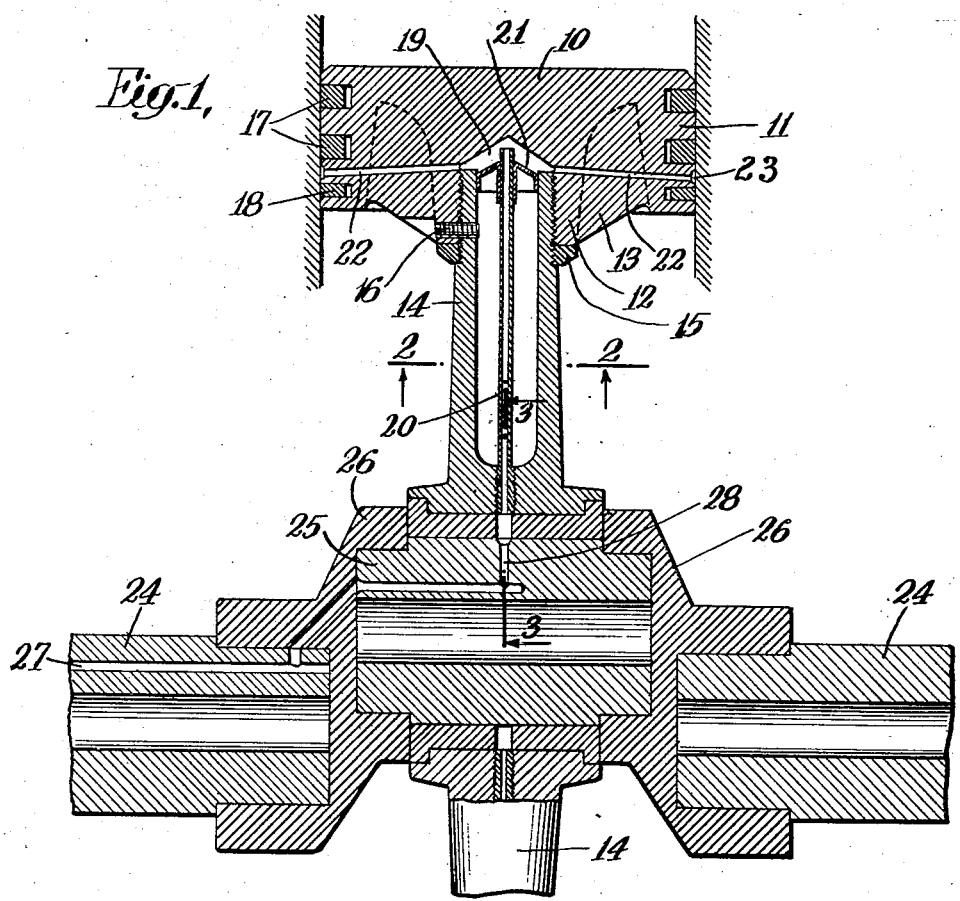
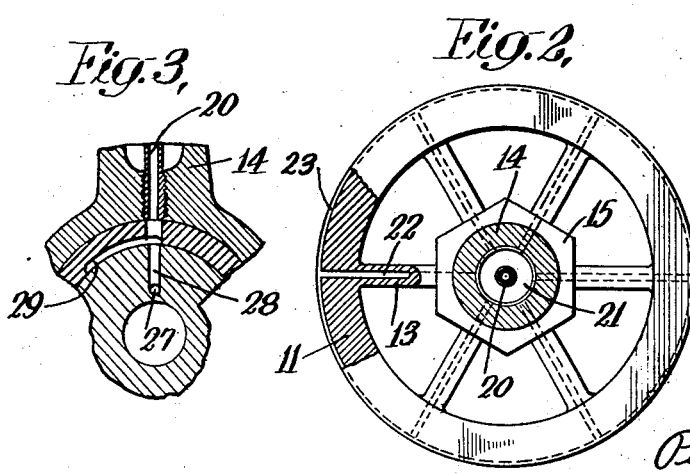

PETER P. SMITH, JR., OF JERSEY CITY, NEW JERSEY, ASSIGNOR TO MONAHAN ROTARY ENGINE CORPORATION, OF NEW YORK, N. Y., A CORPORATION OF NEW YORK.

PISTON.

1,304,615.  Specification of Letters Patent.  Patented May 27, 1919.

Application filed December 31, 1917. Serial No. 209,613.

*To all whom it may concern:*

Be it known that I, PETER P. SMITH, Jr., a citizen of the United States, and resident of Jersey City, in the county of Hudson and State of New Jersey, have invented certain new and useful Improvements in Pistons, of which the following is a specification.

This invention is an improvement in pistons and has for its main objects to improve the lubrication; facilitate the cooling; and improve the connection to the crank.

Where lubricating oil is delivered through the piston rod to the piston and thence radially to the periphery of the piston, the rapid movement of the piston rod in one direction tends to produce a relative movement of the oil through the piston rod in the opposite direction, due to the inertia of the oil. Thus, there would be a natural tendency to deliver a greater quantity of oil to the cylinder wall during what is commonly known as a down-stroke of the piston. The distribution of oil on the cylinder wall during the power stroke in an internal combustion engine subjects the oil to the burning gases in the working chamber and burns or carbonizes them before they can be utilized in lubricating the piston on its up or exhaust stroke.

In my improved construction, I so design and construct the oil passage-way that the inertia of the oil during the down-stroke does not result in the delivery of oil to the cylinder wall although it may, and preferably does, result in the delivery of oil up the piston rod to a chamber in the piston. This oil in the piston chamber may be delivered to the cylinder wall as a result of its own inertia during the up-stroke of the piston. Thus, most of the oil is delivered to the cylinder wall only during the up-strokes and is in position to lubricate the piston during the downstrokes as distinguished from delivering during the down-strokes and being left on the cylinder wall to be turned or carbonized before it can substantially serve any useful purpose.

As a further important feature of my invention, I make the piston with a central tubular boss into which the tubular piston rod projects and is rigidly secured. This provides a light rigid construction and enables me to make the piston of gradually decreasing thickness from this boss toward the periphery so that the pressure of the gas on the piston face is properly transmitted to the piston rod. It also permits of the use of radial flanges serving the triple function of cooling fins, braces for the peripheral wall and conduits for the lubricating oil.

In the accompanying drawings to which reference is to be had, I have illustrated one embodiment of my invention but it will be evident that other forms may be readily designed within the scope thereof as defined in the appended claims. In these drawings, Figure 1 is a central longitudinal section of the piston and also of the piston rod and crank shaft, and Figs. 2 and 3 are sections on the lines 2—2 and 3—3 respectively of Fig. 1.

Although my improved piston may be used in various forms of engines, compressors, pumps or other mechanisms, yet it is particularly designed for use in a four cycle internal combustion engine of the type shown in the Patrick J. Monahan Sullivan applications, Serial Nos. 204,575 and 204,576, filed November 30th, 1917. In the engines there shown, the pistons and cylinders are so mounted that two pistons may be connected by a piston rod rigidly secured to both and having a bearing intermediate of its ends for the crank-pin portion of the crank shaft.

The piston, in the specific form illustrated, has a piston face portion 10, a peripheral wall portion 11, a central depending boss 12 and a plurality of radial fins or partitions 13 extending from said boss to the peripheral wall and preferably integral with both.

The head is of its minimum thickness adjacent the peripheral wall and merges into the central boss so that the piston face is of greatest thickness at the center. A piston rod 14 has its end threaded into the central aperture or chamber in the boss 12 and is locked to the latter in any suitable manner, as, for instance, by interengaging screw threads and a lock nut 15, or by means of a set screw or locking pin 16, or by both such means. The piston is thus somewhat in the nature of a cantaliver and the pressure on all parts of the face is properly transmitted to the central piston rod. The partitions or fins 13 brace the peripheral wall and also facilitate the rapid cooling of the structure. The peripheral wall may have any form of packing rings, conventionally shown as the rings 17, and may have an additional ring 18 serving as a scraper.

Within the piston and at the upper end of the piston rod 14, I provide an oil chamber 19 of such capacity as may be found necessary or desirable and to which oil may be delivered through the piston rod. The rod is shown as having a comparatively thin wall which will give the desired size and strength without unnecessary weight and extending lengthwise through the rod is an oil tube 20. This terminates within the oil chamber 19 and at such a point above the bottom of the latter as to prevent oil from draining back through said tube by gravity.

The oil chamber may be formed in various ways as, for instance, by a small partition or annular collar 21 extending from the oil tube to the wall of the piston rod. This may be adjusted along the tube to vary the capacity of the chamber 19 if desired.

From the chamber 19, oil passages 22 extend radially to the peripheral wall. These may be bored through the fins 13 to avoid the necessity of using connecting tubes. There may be any desired number of these passages, one for each fin if desired, although a smaller number of passages may serve to deliver the necessary amount of oil. The periphery of the piston preferably has an annular groove or duct 23 communicating with the outer extremities of these several passages. The passages are shown as being inclined slightly so that their outer ends are farther from the piston face than their inner ends. This is desirable although efficient results may be secured if the passages are in a plane at right angles to the axis of the piston or even incline slightly in the opposite direction so long as their delivery ends and the distributing duct 23 is farther from the piston face than is the outlet end of the tube 20 which delivers to the chamber 19.

Oil may be conducted to the tube 20 in various different ways. I have illustrated a crank shaft made up of crank portions 24, a piston pin portion 25 and crank arm portions 26. An oil duct 27 is formed through these several sections lengthwise of the shaft to a radial duct 28 in the piston pin in the transverse plane of the tube 20. The duct 28 and the tube 20 may be in communication at all times by means of an annular groove in the periphery of the piston pin, or a groove in the inner surface of the piston rod bearing, or they may communicate only intermittently so as to cut off the supply of oil during any desired portion of the piston stroke.

In Fig. 3, I have shown the lining of the piston rod bearing provided with a short groove 29 so that the duct 28 communicates therewith only during a portion of each revolution. The length of this groove may be varied at will or may be extended in either or both directions from the tube 20.

In the operation of my improved construction, the oil in the tube 20 will, by reason of its inertia, tend to lag behind during a down-stroke of the piston and will therefore tend to have an upward movement relative to the piston. In other words, even though the oil moves down with the piston, it will tend to move at a slower rate and thereby accumulate in the chamber 19. At the same time, there is very little, if any, tendency of the oil in the passages 22 to move in either direction, but such tendency as there is will lead it away from the cylinder wall, or at least will not deliver it to the cylinder wall in profusion. During the return stroke of the piston, the oil which has accumulated in the chamber 19 cannot return through the tube 20 but will, by its inertia, press against the lower part of the chamber and flow out through the passages 22 and lubricate the cylinder wall. Therefore, the main portion of the oil delivery to the cylinder wall takes place during the up-strokes of the piston, rather than during the down-strokes, and after each up-stroke, the cylinder wall is properly lubricated preparatory to the next down-stroke, rather than covered with lubricating oil only to be burned off before the piston returns.

By the terms "up-stroke" and "down-stroke," it will, of course, be understood that I have no particular reference to the movements in respect to the horizontal, but mean by "down-stroke" the movement resulting in increase in the size of the working chamber and by "up-stroke" a movement resulting in the decrease in the size of said chamber. The effect of inertia on the oil during high speed piston movements is far greater than any action of gravity and the operation is the same irrespective of the position of the axis in respect to the horizontal.

Having thus described my invention, what I claim as new and desire to secure by Letters Patent is:

1. A piston having a piston head presenting a depending boss, the thickness of said head decreasing from the center toward the periphery, a peripheral wall, radiating flanges connecting said wall and said boss, means for delivering oil to the interior of said boss, and a series of passages extending from said boss through said flanges to the periphery of the piston.

2. A piston having an oil chamber therein, a hollow piston rod rigidly secured to said piston, and terminating in said chamber, an oil pipe extending through said piston rod, an annular downwardly and outwardly inclined member connected to the inner end of said tube and forming an end wall for said chamber, and passages leading from said chamber to the periphery of the piston, the inclination of said wall tending to facilitate the movement of the oil out through said passages during the upstroke of the piston.

3. A piston having an oil chamber therein, a hollow piston rod rigidly secured to said piston, and having an oil delivery pipe extending into said chamber, an annular member connected to the inner end of said tube and forming an end wall for said chamber, and passages leading from said chamber to the periphery of the piston.

4. A piston having a piston head presenting a centrally disposed annular boss, a peripheral wall, radiating flanges connecting said wall and said boss, means for delivering oil to the interior of said boss, and a series of passages extending from said interior through said flanges to the periphery of the piston.

5. A piston having a piston head presenting a centrally disposed annular boss, a hollow piston rod extending into said boss and rigidly secured thereto, means for delivering oil through said piston rod to the interior of said boss, a series of radiating flanges connecting said boss to the periphery of the piston, and having passages therethrough from the interior of said boss to said periphery.

Signed at New York, in the county of New York and State of New York, this 27th day of December, A. D. 1917.

PETER P. SMITH, Jr.